United States Patent [19]

Hyatt et al.

[11] E Patent Number: Re. 32,027

[45] Reissued Date of Patent: Nov. 12, 1985

[54] WET PICK-UP VACUUM UNIT MOTOR BEARING AIR SEAL

[75] Inventors: Robert L. Hyatt, Tallmadge; Norbert H. Niessner, Kent, both of Ohio

[73] Assignee: Ametek, Inc., Kent, Ohio

[21] Appl. No.: 546,420

[22] Filed: Oct. 28, 1983

Related U.S. Patent Documents

Reissue of:

[64] Patent No.: 4,088,424
Issued: May 9, 1978
Appl. No.: 799,241
Filed: May 23, 1977

U.S. Applications:

[63] Continuation of Ser. No. 145,667, May 1, 1980, abandoned.

[51] Int. Cl.[4] ..... F04B 39/06; A47L 9/22

[52] U.S. Cl. ..... 417/368; 417/373; 417/423 A; 15/413; 277/133

[58] Field of Search ..... 15/412, 413; 417/368, 417/373, 423 R, 423 A, 424; 277/3, 12, 133, 134, 226

[56] References Cited

U.S. PATENT DOCUMENTS

| | | | |
|---|---|---|---|
| 2,726,807 | 12/1955 | Lewis | 417/423 A |
| 3,733,150 | 5/1973 | Porter et al. | 417/424 |
| 3,780,397 | 12/1973 | Harbeck et al. | 15/413 |
| 3,866,263 | 2/1975 | Crouser et al. | 15/412 |
| 3,932,070 | 1/1976 | Porter et al. | 417/423 A |

FOREIGN PATENT DOCUMENTS

| | | | |
|---|---|---|---|
| 2003905 | 1/1970 | Fed. Rep. of Germany | 15/413 |
| 2341233 | 2/1974 | Fed. Rep. of Germany | 15/413 |

*Primary Examiner*—Louis J. Casaregola
*Attorney, Agent, or Firm*—Oldham, Oldham & Weber Co.

[57] ABSTRACT

A wet pick-up type vacuum motor fan unit with a separately ventilated motor section and a motor end bracket serving also as a support for, and part of a discharge end housing wall for, the working air fan section, has on the bracket fanward face a centrally apertured metal disk plate defining a flow space or path for bearing sealing air flow from ambient air inlets external of the motor section to a central discharge into the inlet eye of an auxiliary fan clamped on the shaft back-to-back with a larger diameter working air centrifugal fan adjacent the end bracket. A stamped shield cup jointly clamped on the shaft with the fans extends out of the auxiliary fan inlet eye into the disk central aperture, surrounding the shaft bearing socket of the bracket and being spaced from the disk aperture edge to afford a sealing air outlet from said space into the auxiliary fan inlet eye; whereby the disk plate and shield afford mechanical shielding, while air, discharging to and from the auxiliary fan, provides air shielding of the shaft and bearing area from working air entrained foam and moisture.

11 Claims, 1 Drawing Figure

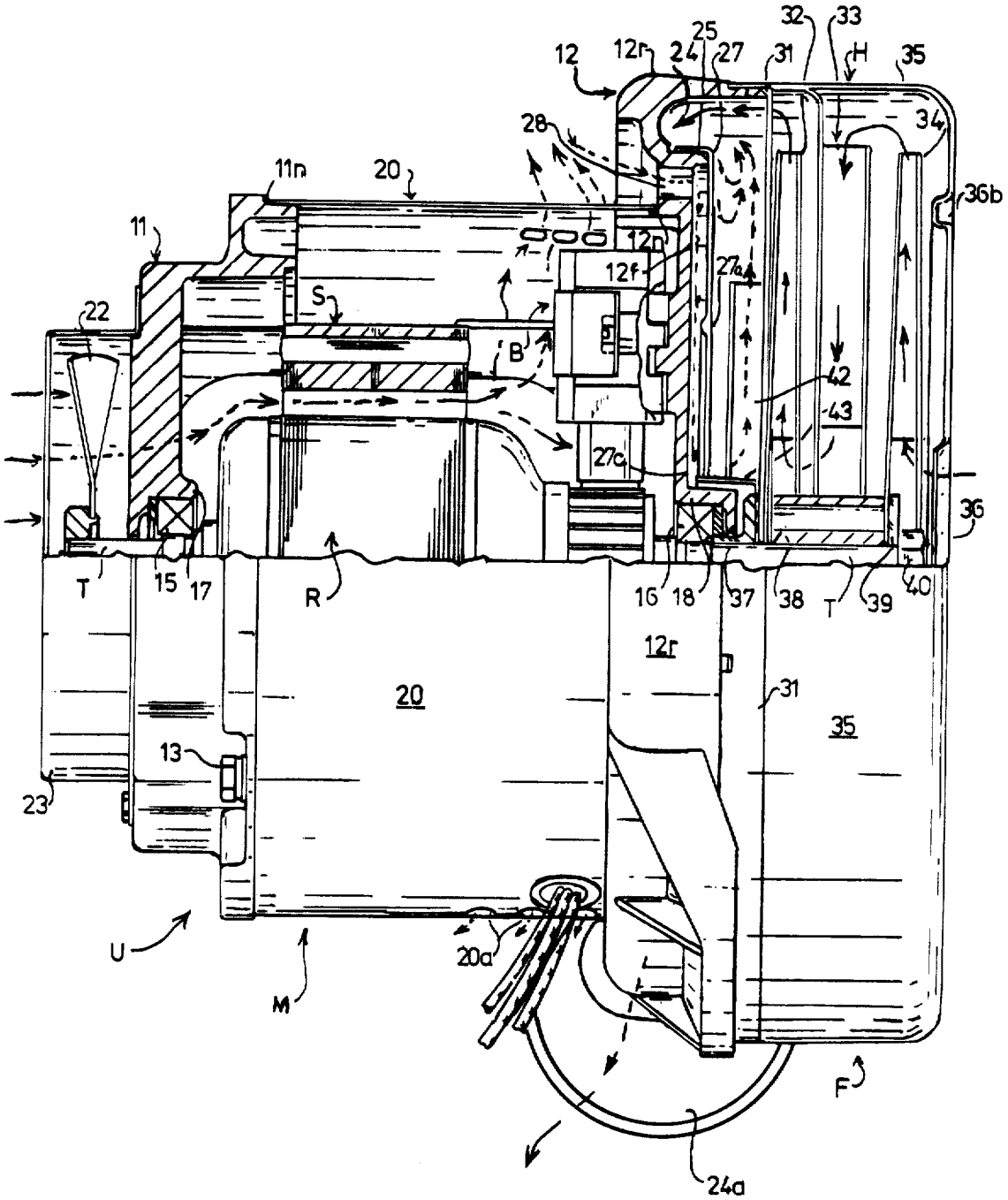
12
12r
24
25
27
31
32
33
H
35
34
36b
28
11n
20
11
12n
12f
27a
S
22
B
42
43
27c
36
T
15
17
R
16
18
37
38
T
39
40
12r
20
31
35
13
23
U
20a
M
F
24a

WET PICK-UP VACUUM UNIT MOTOR BEARING AIR SEAL

Matter enclosed in heavy brackets [ ] appears in the original patent but forms no part of this reissue specification; matter printed in italics indicates the additions made by reissue.

*This is a continuation of application Ser. No. 145,667, dated May 1, 1980, now abandoned, which is in turn a reissue application of U.S. Pat. No. 4,088,424, issued May 9, 1978.*

Generally in modern domestic and commercial electric vacuum cleaners or sweepers, a fan-driving electric motor and a centrifugal fan or fans, as suction fan means, for moving the working air or cleaning air through the cleaner, are incorporated into a motor-fan unit. The motor fan unit is intended as a unit to be assembled into or removable from the overall vacuum cleaner structure which further provides a dirt filter and receptacle, or, in wet pick-up types, a liquid receiver tank.

In wet pick-up floor or carpet cleaner equipment, especially the jet hot water extractor carpet cleaners, which have come into common use, and also in floor scrubbers where a vacuum pick-up of residual or rinse water is used, air-entrained water and dirt are separated from the working air, i.e., suction cleaning or transport air, before the working air stream reaches the suction fans of the apparatus, the separated liquid being either continually drained or withdrawn from the apparatus, or retained in a collection tank.

Now especially in operating jet hot water extractor carpet cleaners, there is applied to the carpet a water and detergent solution, which of course is ultimately to be picked up and sucked into the apparatus. By ordinary practice a "high foam" detergent is not used in such cleaning methods, and usually there is no troublesome foam generation or accumulation in the liquid or liquid collection tank of the cleaner apparatus. However, if the operator cleans a carpet which in fact had been previously cleaned with a high foam detergent or shampoo, or inadvertently uses a high foam detergent in his own cleaning operation, a considerable volume of foam may be generated which finds its way into the suction fans.

Though foam-suppressant compositions are available, and when a foam problem is present or probable, the cleaner operator is expected to use such a composition, especially in the liquid collection tank of a jet hot water extraction cleaner, the suppressant may be omitted or the problem may not be recognized in time. Hence by accident, and not by intent, foam or foam-generating liquid may pass into or through the suction fans of the cleaner. Thus detergent-carrying liquid or foam may find its way in part to the adjacent fan shaft bearing, from which it leaches out the lubricant with consequent and often quite rapid bearing damage.

When foam enters or is generated in the fan system, rather than leaving the fan housing cleanly at its normal working air discharge region, at least in part it may be caught and churned between the last fan and the adjacent bearing-supporting housing wall, in some instances the churning action expanding foams to a much larger volume; whence some part of the foam is then moved inwardly toward the shaft region and there past the ordinarily simple mechanical bearing seals. Very few occurrences of this sort are needed to result in a bearing lubricant loss to such extent that rapid bearing failure results.

By the present invention, to the final or working air discharging centrifugal fan there is clamped in back-to-back relation a smaller diameter auxiliary centrifugal fan to the central inlet eye of which there is introduced along the bearing and shaft region what may be termed "shielding" or "auxiliary" clean air. The auxiliary fan then discharges the "auxiliary" air circumferentially for sweeping foam, from the region between the fan housing wall and back of the working air fan, towards the working air outlet.

Further, a flat-bottomed cup-shaped rotary baffle or seal shield is commonly clamped on the shaft with, and in the inlet eye of, the auxiliary fan, thus surrounding the shaft portion leaving the adjacent bearing; in the case of a motor fan unit, extending towards the fanward end bracket face, also to surround a projecting bearing socket formation thereof. This affords further protection of the bearing region, especially where as in the preferred form a centrally apertured disk plate or baffle is secured on the fanward side of the fan housing end wall, i.e., the fanward end bracket face of a motor fan unit, to define an auxiliary or clean air flow space extending from angularly spaced fresh air inlets radially inward, towards the bearing region, to the central aperture as an annular outlet to the auxiliary fan inlet eye.

By this further somewhat elaborate structure, for the clean air flow, there is provided a further air and mechanical shield against foam or liquid movement to the bearing region, due to any minor recirculation of air from the auxiliary fan peripheral outlet to its central inlet, even under conditions of extreme foam loading.

The general object of the present invention is to provide, for wet pick-up type vacuum sweepers, cleaners and the like, a suction fan and bearing system including an improved safe-guard against foam or detergent reaching the fan shaft bearing region.

A further object is to provide, in an electric motor vacuum fan unit for wet pick-up type vacuum sweepers, cleaners and the like, a suction fan and bearing system including an improved safe-guard against foam or detergent reaching the fanward end bearing region of the motor and bracket.

A still further and more particular object of the present invention is to provide an electric motor vacuum fan unit of the character described, including an improved air seal for the bearing, whereby foam and detergent entrained in working air [is] *are* prevented from gaining access to the fanward end bearing of the motor, there to leach out lubricant and hence to result in premature bearing failure.

Other objects and advantages will appear from the following description and the drawing which shows an electric motor vacuum fan unit generally of a type commonly used for vacuum sweepers and as well cleaners of the wet pick-up type, wherein the unit is shown partially in elevation and partially in longitudinal axial section.

The motor-fan unit U shown in the drawing has a general organization of known type being comprised of a separately ventilated motor section M and a vacuum fan section F, wherein working air moving centrifugal fans 32 and 34 are clamped directly on the motor rotor shaft T projecting from the motor section into the fan section housing.

In the motor section M, as the primary motor housing or stator structure, the left motor end bracket 11 and the right or fanward motor end bracket 12 are secured in engagement with opposite ends of a wound stator or field core structure S by field clamp bolts 13, extending through 11 and threaded into 12. The rotor R is supported to rotate within the field and stator structure by the shaft T with projecting right and left ends extending through appropriate bearing structures 15, 16 received in inwardly facing bearing sockets 17, 18; the rotor here being a commutating armature for which appropriate brush rigging, as indicated by the brush B, is mounted on the motor or inward face of the fanward end bracket 12.

Though series universal motors are commonly used, the invention, of course, is applicable to units with other motor sections of any appropriate electrical design, and also to units with mechanical variations; for example, brushing rigging could be supported on the left end bracket.

A punched metal band 20 is wrapped around annular shallow flat-bottomed receiving formations 11n and 12n on the end bracket members with its ends secured to each other, either permanently or in a readily removable manner, to form a motor housing circumferential closure, which is appropriately punched with air outlet apertures, particularly as at 20a for motor ventilating air exhausting over the commutator and brush region. By axial flow ventilation fan 22 secured on the left outboard end of the shaft T, that air is drawn in through numerous cooling air inlet apertures in the flat-ended, flange-rimmed cup-shaped ventilating fan cover 23, passing through apertures in the end bracket 11, and then; through the length of the motor section, especially between rotor and stator structure, for effective motor cooling.

In addition to serving as an end bracket for the motor as such providing the motor right end bearing socket 18, and providing support for the brushes, the member 12 first provides the inner end wall for the fan housing structure, generally indicated at H, and a rightwardly projecting rim 12r having a slight rabbetted annular rim portion for receiving a cup-shaped element as part of the fan housing H. Here, as shown further in the circumferential rim region of member 12, the particular form of fan housing and discharge further provides a scroll type expanding air outlet path including a channel 24 inward of the rim portion 12r, which is open axially to the right to receive air discharging from the periphery of the adjacent suction fan. The channel has a flow area continually increasing by increase in longitudinal, i.e., axial depth, as the channel approaches an outlet at discharge connection flange 24a integral with member 12.

The channel 24 is defined between an inner annular face of the rim portion 12r and a minor channel wall surface continued to the left from an annular bead 25. The inner circumferential wall of channel 24, hence bead 25, is about even with the outer, i.e., discharge, periphery of the second stage impeller 32.

Bead 25 is concentric with the shaft and projects from a main face of 12 to the right to sealingly receive and support the short axially flanged rim of a centrally apertured disk plate or baffle plate 27. Thus the disk 27 is spaced from the bracket flat end face 12f within that said bead; and it may be stiffened by annular groove 27a. The disk central outlet aperture 27c accommodates the right bearing socket 18 projecting therethrough and a shield structure 43, and affords an outlet to the inlet eye of fan 42 for auxiliary air entering at inlets 28, as hereinafter detailed.

Auxiliary air inlets 28 are provided through the end bracket wall at angularly spaced locations just within bead [27] *25* thus lying at a location radially outward of band 20, hence effectively external of the motor housing structure.

The fan section F actually represents a two-stage design. The fan housing H conventionally includes shell structure fitted onto the exterior of the rim 12r, and here comprising two flat-bottomed cylindrical-walled drawn sheet metal shells 31 and 35. The shell portion 31, with its cylindrical wall fitted on the rim and surrounding the radially tapered second stage impeller 32, has a radial wall with a central opening as the inlet to the eye of the second stage impeller and having fixed on its outer or rightward face conventional stationary vanes 33. Thus the discharge periphery of impeller 32 is axially offset from the housing outlet therefor to discharge outwardly and then feed axially into the previously described channel 24.

For a first stage impeller 34 identical to impeller 32, the second shell portion 35 is telescoped onto a slightly reduced cylindrical end portion of 31, and in its basically flat-bottomed, i.e., radial wall region, has a large central inlet opening 36 for flow of working air axially to the first stage impeller inlet eye. A concentric annular inward beading 36b provides not only some structural rigidity for the end wall, but also a degree of pinching off the area between that housing front wall and the adjacent front end face of the impeller 34, to some degree to prevent recirculation from the impeller peripheral discharge area back to its inlet eye. Both the fans here are shown in a preferred radially tapering form now known to the art, comprising a main body disk centrally apertured for the shaft, an annular disk, and a series vane elements fixed therebetween.

Conventionally the first stage impeller 34 and second stage impeller 32 are secured on the rightwardly projecting end of the motor rotor shaft by means of a first axial spacer 37 including a sleeve portion about the shaft bearing against the inner race of ball bearing 16 and having a radial flange affording a clamping reaction surface for the main disk of fan 34; an elongated interstage spacer 38 between the impellers; an external washer 39 on the outer side of the first stage impeller body disk; and finally the clamping nut 40 threaded onto the shaft end.

The flow path of a working air from the inlet 36 of the housing H through the first stage impeller 34, the interstage "stationary fan" 33, the second stage working impeller 32, to the channel 24 leading to outlet 24a, is indicated by the solid arrows. The flow path of ventilating air for the motor is indicated by the dash-dotted direction arrows in the motor section.

Moreover, on the shaft T and between the flanged member 37 and the main disk of impeller 32, there are further clamped a "non-tapered" auxiliary fan 42 of appreciably smaller diameter than, and in back-to-back relation with, fan 32; and also a cup-shaped further baffle or shield element 43 centered in the eye of fan 42. It will be observed that the circumferential wall of shield member 43 has a fairly close running clearance about the rightwardly projecting bearing socket 18, and also extends axially through the central opening of the disk 27 towards flat fanward face 12f of end bracket 12. Thus the annular outlet, from the auxiliary air path or flow space defined between 27 and 12, in effect opens along the exterior surface of shield cup 43 into the eye of fan 42.

As indicated by the dotted arrow lines, the auxiliary air or bearing sealing air flows inwardly from the inlets 28, then axially past the bearing region into the eye of fan 42, and from the latter discharges, toward the main or working air outlet channel 24, through the space between the impeller 32 and the effective inner face of the fan housing, i.e., the disk plate 27. Thus a first obstacle to foam or detergent movement toward the bearing is provided by the auxiliary air discharging from fan 42; a second, by the flow of air through the outlet 27c around the shield 43 into the eye of fan 42; and a third and fourth, by the presence of the disk 27 forward of the face 12f in conjunction with the rotating cup shield both as extending in to the central aperture 27c and also as surrounding the bearing socket.

What we claim is:

1. In a wet pick-up type vacuum cleaner fan unit with a cleaning working air centrifugal fan impeller mounted on a fan shaft supported in a lubricated bearing received in a central socket of a fan housing end wall, said impeller peripherally discharging to a working air outlet of the housing located adjacent to said end wall, the improvement comprising:

a centrally apertured disk plate circumferentially engaged and sealed upon and spaced from the fanward inner face of the said end wall;

a plurality of angularly spaced auxiliary or sealing air inlets through said wall from the exterior to an air flow space defined between the disk and end wall face;

an auxiliary centrifugal fan of smaller diameter than, and in back-to-back relation with, said working fan impeller, said auxiliary fan being clamped on said shaft with its inlet eye facing the central aperture of said disk to receive auxiliary air therefrom;

a shield cup received with circumferential spacing in the auxiliary fan inlet eye and having a centrally apertured flat bottom conjointly clamped with said fans on said shaft, and extending through the central aperture of the disk to define with the edge thereof a discharge outlet from said flow space into the auxiliary fan eye;

whereby said shield and disk provide structural screening around said bearing socket and shaft, and said auxiliary fan, shield and disk further moving auxiliary screening and sealing air axially exterior to the socket and on out to a common discharge of said back-to-back auxiliary and working air fans to prevent foam and working air entrained detergent from approaching said bearing.

2. A wet pick-up type vacuum cleaner fan unit improvement as described in claim 1, wherein the bearing-receiving central socket projects from said end wall toward the adjacent but axially spaced working air fan; and said shield cup has its circumferential wall surrounding the socket projection with running clearance.

3. A wet pick-up type vacuum cleaner fan unit improvement as described in claim 2, wherein said socket projects through the central aperture of said disk plate into the central inlet eye of the auxiliary fan.

4. A wet pick-up type vacuum cleaner fan unit improvement as described in claim 3, wherein the inner face of said end wall is provided with a circular bead concentric with the shaft and located radially outward of said air inlets;

said disk having a cylindrical short rim flange fitted over said bead thereby to secure and seal the disk to said end wall.

5. A wet pick-up type vacuum cleaner fan unit improvement as described in claim 1, wherein said end wall is an end bracket comprising part of a motor housing of an electric motor incorporated in said unit as a motor-fan unit; and the motor housing is ventilated by a cooling air stream separate from the working air stream.

*6. In a wet pick-up type vacuum cleaner fan unit in which the working air (by which cleaning is performed) is driven by a working air fan, said fan is mounted on a fan shaft journaled in a bearing supported by a fan housing end wall which extends transversely of said shaft, said fan discharging, through at least one outlet of the housing, the working air which is drawn by said fan through an inlet to said housing, the improvement comprising:*

*a baffle plate having a substantially central aperture through which said shaft extends into said housing, said plate being in a substantially peripheral engagement with the inner face of said end wall but elsewhere spaced therefrom in the direction of said working air fan to provide air flow space between said wall and plate;*

*at least one auxiliary sealing air inlet leading through said wall into said air flow space, any such auxiliary air inlet being spaced from said shaft and any such outlet;*

*an auxiliary fan mounted on said shaft between said working air fan and said baffle plate, said fan having its inlet eye facing the aperture of said baffle plate to receive sealing air therefrom; and*

*means having an outer surface substantially concentric with said shaft and which is partly located within, but radially inwardly spaced from, the eye of said auxiliary fan, said means and said fans being mounted on said shaft for rotation therewith, said means extending axially from said auxiliary fan through the aperture of said baffle plate at least as fan as said bearing, the surface of said means where it passes through the aperture of said baffle plate being peripherally spaced therefrom to provide a substantially annular opening for auxiliary sealing air entering and flowing in said air flow space toward said shaft in order to pass axially through said annular opening into the auxiliary fan eye and thence radially outwardly to a common discharge of air from said auxiliary and working air fans, such passage of sealing air axially through said annular opening thereby inhibiting the approach to said bearing of foam and liquid entrained in said working air.*

*7. A wet pick-up type vacuum cleaner fan unit improvement as defined in claim 6, wherein said bearing support projects inwardly from said end wall toward, but is axially spaced from, the said working air fan; said means having an outer surface substantially concentric with said shaft is a shield cup; and the rim of said shield cup surrounds the projection of the bearing support and extends to the inner face of said end wall with a running clearance.*

*8. A wet pick-up type vacuum cleaner fan unit improvement as defined in claim 7, wherein said bearing support*

*projects through the aperture of said baffle plate and at least partly into the central inlet eye of the auxiliary fan.*

*9. A wet pick-up type vacuum cleaner fan unit improvement as defined in claim 8, wherein the inner face of said end wall is provided with a peripheral projection which is substantially concentric with the shaft and located, with respect to said shaft, outwardly of said air inlets; said baffle plate has a rim flange fitted over said projection thereby to secure and seal the baffle plate to said end wall.*

*10. A wet pick-up type vacuum cleaner fan unit improvement as defined in claim 6, wherein said fan housing end wall is also the end bracket of a separate housing for an electric motor having an armature shaft which is extended through said bearing to serve as the said fan shaft and any auxiliary sealing air inlet is located exteriorly of the balance of the portion of the unit which serves as the said housing for said motor, said motor housing having openings therein for the inlet and outlet of air for cooling said motor, whereby the motor-cooling air stream is separate from the working and cooling air streams.*

*11. In a wet pick-up type vacuum cleaner fan unit comprising a motor, means for moving cooling air past said motor, a housing for said motor, said motor housing having at least one inlet and at least one outlet for said motor cooling air, a fan housing, an end wall for said fan housing segregating said fan housing from said motor, motor housing, and any inlet or outlet thereof for motor-cooling air, a rotatable fan shaft extending through said end wall into said fan housing, a bearing which is supported in said end wall and in which said shaft is journaled, said shaft rotatingly connected to said motor, said fan housing having at least one inlet and one outlet for working air by which cleaning is performed, the improvement comprising:*

*at least one auxiliary sealing air inlet extending through said wall, such auxiliary air inlet being spaced from said shaft and any outlet for working air,*

*baffle plate means mounted on the side of said wall within said fan housing and having an aperture through which said shaft extends as it enters said housing, said baffle plate means extending from any auxiliary air inlet to a position adjacent said shaft to define an air flow space extending from any said auxiliary air inlet to and around said shaft, the periphery of said shaft and any means mounted thereon which also extends through and is spaced from said aperture defining, when said shaft is rotated, the inner periphery of an annular opening from said air flow space into said housing and the periphery of said aperture defining the outer periphery of said annular opening, and*

*fan means mounted on said shaft, forcing said working air through said fan housing, and presenting toward said annular opening a fan eye whereby, when said shaft is rotated, auxiliary sealing air is drawn through said auxiliary air inlet, air flow space, and axially through said annular opening into said fan eye for discharge with the working air through a working air outlet of said housing, whereby passage of auxiliary air through said annular opening inhibits the approach to said bearing, during rotation of said shaft, of foam or liquid entrained in said working air, and wherein said auxiliary sealing air is exclusive of any cooling air moving past said motor.*

* * * * *